UNITED STATES PATENT OFFICE.

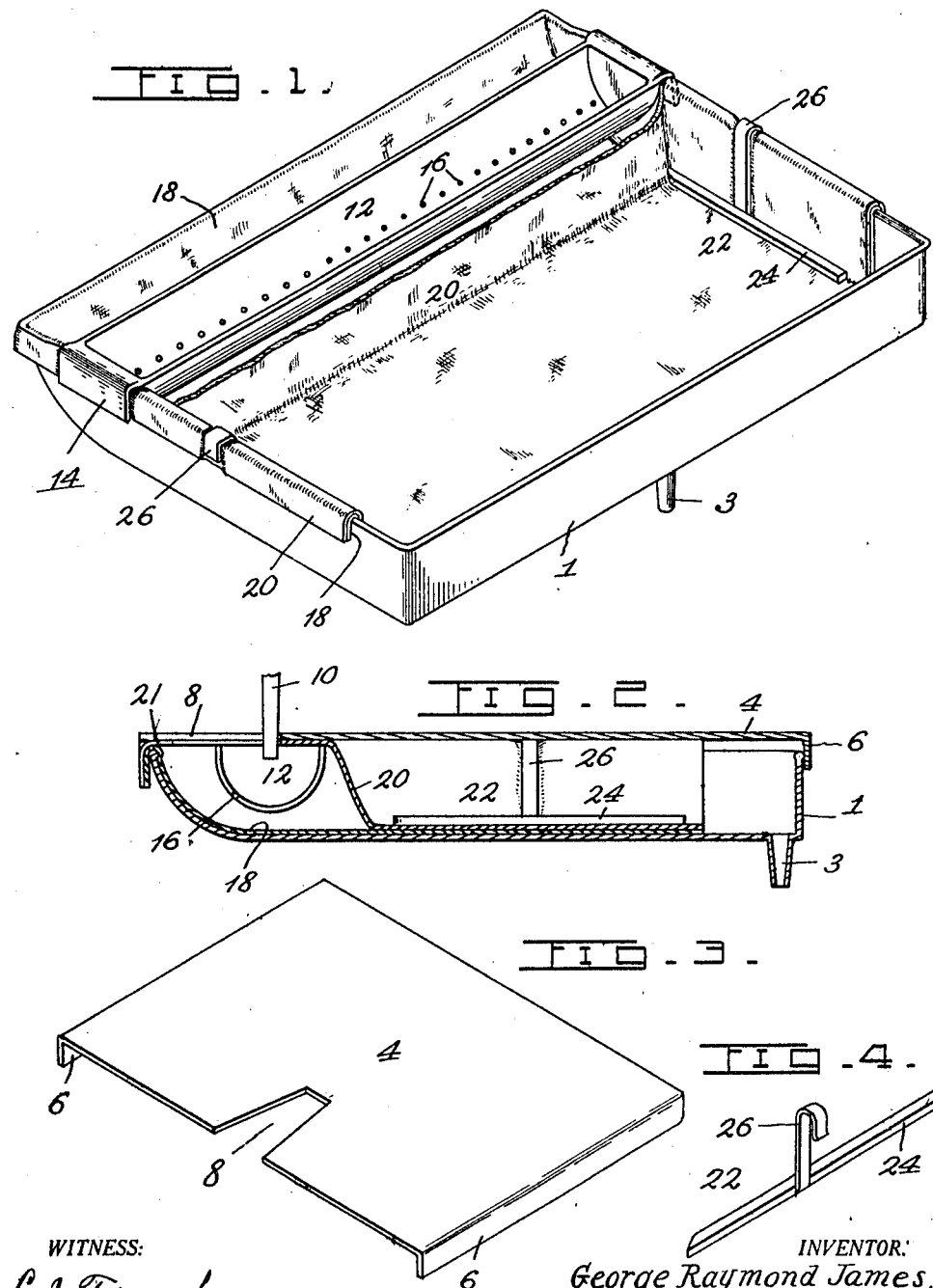

GEORGE RAYMOND JAMES, OF HICKMAN MILLS, MISSOURI.

MILK-STRAINER.

1,313,992.     Specification of Letters Patent.     Patented Aug. 26, 1919.

Application filed February 6, 1919. Serial No. 275,320.

*To all whom it may concern:*

Be it known that I, GEORGE RAYMOND JAMES, a citizen of the United States, residing at Hickman Mills, in the county of Jackson and State of Missouri, have invented certain new and useful Improvements in Milk-Strainers, of which the following is a specification.

My invention relates to milk strainers and one object is to provide a device of this character which is more efficient in removing impurities from milk than the gravity strainers now in general use which not only fail to remove all of the impurities but frequently becomes clogged while in use.

Other objects will hereinafter appear, and in order that the invention may be fully understood, reference will now be made to the accompanying drawings, in which:

Figure 1 is a perspective view of the strainer with its cover removed and a portion of the upper straining cloth broken away.

Fig. 2 is a cross section of the complete strainer.

Fig. 3 is a reduced perspective view of the cover.

Fig. 4 is a detail perspective view of a retaining member.

In carrying out the invention, I employ a broad, shallow pan or receptacle 1 provided with a discharge spout 3 and a removable cover 4. Said cover 4 is provided at its ends and forward side with downturned flanges 6 to hold it in position upon the receptacle 1. A slot 8 extends forwardly from the rear edge of the cover 4 to admit the lower end of a nozzle 10, leading from a suitable tank (not shown), in which the milk to be strained is poured preparatory to having it enter the strainer.

12 designates a distributing trough arranged beneath the nozzle 10 and provided at its ends with downturned hooks 14, adapted to engage over the ends of the receptacle 1 to hold said trough 12 in position. The lower portion of the trough 12 is provided with a row of perforations 16 through which the milk discharges upon a strainer cloth 18 covering the bottom, rear and ends of the receptacle 1. As disclosed by Fig. 2, the row of perforations 16 is located on a slightly higher plane than the lowermost portion of the trough 12, to allow the larger particles of foreign matter to settle in said lowermost portion and thus avoid clogging the perforations 16.

20 designates a second strainer cloth to coact with the first one in removing impurities from the milk. Said second strainer cloth 20 lies directly against the strainer cloth 18 at all points excepting its rear portion and passes over the trough 12 instead of under the same as in the case of said cloth 18. The cloths 18 and 20 consists of any suitable material. In practice, I have found that cotton batting with the rough sides placed together are very efficient in removing all foreign matter from the milk. The cloth 20 has a slot 21 registering with the slot 14 to admit the spout 10. The cloths are held in position in the receptacle 1 by a pair of retaining members 22, each of which consists of a longitudinal element 24 adapted to hold the cloths in one corner of the pan, and a clamp member 26 which holds the cloths in folded position over one margin of the pan.

In practice, the strainer cloths 18 and 20 are arranged in the receptacle 1 as shown and described, and said receptacle is placed below the nozzle 10, after which the cover 4 is placed in position to exclude dust and other foreign matter from the receptacle. The milk is then permitted to flow through the nozzle 10 which is, preferably, provided with a valve (not shown) to regulate the flow of milk therethrough, so that it will not overflow the trough 12. As the trough 12 is supplied with milk the latter discharges in jets through the perforations 16 upon the cloth 18 and flows in a thin sheet between the cloths 18 and 20 to the forward side of the receptacle 1, from which it discharges through the spout 3 into buckets or other receptacles placed beneath said spout 3.

Owing to the fact that the receptacle 1 is placed in, substantially, a horizontal position the milk flows very slowly between the strainer cloths 18 and 20, so that all impurities will have ample time to settle in the broad straining surfaces presented by said cloths before the milk escapes through the discharge spout 3. Should the impurities accumulate at any point in the straining surface and tend to dam up the milk, the pressure of the latter against the upper cloth 20 will cause the same to yield upwardly, so that the milk can pass freely over the impurities and thus overcome all danger of clogging.

After the device has been used it can be readily disassembled so that the various parts can be thoroughly cleansed and kept in a sanitary condition.

While I have shown and described the preferred form of my invention, I reserve the right to make such changes in the construction, combination and arrangement of parts as properly fall within the spirit and scope of the claims.

Having thus described my invention, what I claim and desire to secure by Letters Patent, is:

1. A strainer consisting of a shallow receptacle having an outlet, and two straining cloths laid over the bottom of said receptacle and spaced apart at their rear portions to permit a fluid to enter between said cloths, for the purposes described.

2. A strainer consisting of a shallow receptacle, a straining element laid over the bottom and sides of said receptacle, and retaining members having elements to hold said straining element in position on the bottom and elements to hold said straining element against the sides of the receptacle.

3. A strainer consisting of a shallow receptacle having a nonperforate bottom, a straining element laid over the bottom and sides of said receptacle, a perforated trough at one end of the receptacle for distributing a fluid to be strained over said element, a discharge spout at the opposite end of the receptacle and a cover for the receptacle.

4. A strainer consisting of a shallow receptacle having an outlet, two straining elements laid over the bottom of said receptacle and spaced apart at their rear portions to permit a fluid to enter between said elements, and means placed in such space to discharge a fluid to be strained between said elements.

5. A strainer consisting of a shallow receptacle having an outlet, two straining elements laid over the bottom of said receptacle and spaced apart at their rear portions to permit a fluid to enter between said elements, a perforated trough removably located in such space, and a cover for the receptacle.

6. A strainer consisting of a receptacle having a nonperforate bottom over which a fluid may flow, straining mediums laid over said bottom, means for introducing a fluid between said straining mediums, and a discharge opening at one end of the receptacle through which the strained fluid may escape.

7. A strainer consisting of a shallow rectangular receptacle arranged to receive a fluid at one end and discharge said fluid at its opposite end, a straining element laid over the bottom and sides of said receptacle to strain the fluid as it flows over the bottom of the receptacle from end to end, and means for distributing the fluid from side to side of the receptacle.

In testimony whereof I affix my signature, in the presence of two witnesses.

GEORGE RAYMOND JAMES.

Witnesses:
F. G. FISCHER,
L. J. FISCHER.

Copies of this patent may be obtained for five cents each, by addressing the "Commissioner of Patents, Washington, D. C."